(12) United States Patent
Chu

(10) Patent No.: US 12,255,563 B2
(45) Date of Patent: Mar. 18, 2025

(54) MOTOR CONTROLLER

(71) Applicant: Global Mixed-mode Technology Inc., Hsin-Chu (TW)

(72) Inventor: Chien-Lun Chu, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 243 days.

(21) Appl. No.: 17/329,183

(22) Filed: May 25, 2021

(65) Prior Publication Data

US 2022/0385223 A1 Dec. 1, 2022

(51) Int. Cl.
*H02P 27/04* (2016.01)
*H02P 6/16* (2016.01)

(52) U.S. Cl.
CPC ............... *H02P 27/04* (2013.01); *H02P 6/16* (2013.01)

(58) Field of Classification Search
CPC .......... H02P 21/34; H02P 21/10; H02P 27/08; H02P 27/06; H02P 27/04; H02P 6/28; H02P 6/157; H02P 6/182; H02P 6/187
See application file for complete search history.

(56) References Cited

U.S. PATENT DOCUMENTS

| | | | | |
|---|---|---|---|---|
| 4,467,256 A | * | 8/1984 | Antognini | G04C 3/143 968/491 |
| 6,034,493 A | * | 3/2000 | Boyd | H02P 6/15 318/400.31 |
| 10,027,269 B2 | | 7/2018 | Khalaf | |
| 10,238,386 B2 | | 3/2019 | Overmyer | |
| 10,326,391 B2 | | 6/2019 | Leman | |
| 2004/0017172 A1 | * | 1/2004 | Hoashi | H02P 6/085 318/599 |
| 2006/0197482 A1 | * | 9/2006 | Harwood | H02P 6/182 318/432 |
| 2018/0115263 A1 | * | 4/2018 | Buckley | H02P 6/182 |
| 2021/0094158 A1 | * | 4/2021 | Kato | B25B 21/026 |

FOREIGN PATENT DOCUMENTS

| | | |
|---|---|---|
| CN | 103825507 B | 8/2017 |
| CN | 105186949 B | 6/2018 |
| CN | 105827163 B | 9/2018 |
| CN | 104885354 B | 12/2018 |
| JP | 6009070 | 10/2016 |
| TW | 200642235 | 12/2006 |
| TW | 200901614 | 1/2009 |
| TW | 201110532 A1 | 3/2011 |

(Continued)

*Primary Examiner* — Bickey Dhakal
(74) *Attorney, Agent, or Firm* — Winston Hsu

(57) ABSTRACT

A motor controller comprises a switch circuit, a control unit, and a pulse width modulation signal, where the pulse width modulation signal has a duty cycle. The motor controller is used for driving a motor, where the motor has a coil. The switch circuit is configured to supply a coil current to the coil. The control unit is configured to generate a plurality of control signals to control the switch circuit. When the motor controller enters an early alignment state, the motor controller enables the coil current to achieve a predetermined value within one electric period. When the coil current achieves the predetermined value, the control unit records the duty cycle. The motor controller is configured to increase a success rate of starting the motor.

7 Claims, 2 Drawing Sheets

(56) References Cited

FOREIGN PATENT DOCUMENTS

| TW | 201507338 A | 2/2015 |
|---|---|---|
| TW | I671994 B | 9/2019 |
| TW | I687037 B | 3/2020 |
| TW | 202112048 A | 3/2021 |
| TW | I750095 B | 12/2021 |

\* cited by examiner

MOTOR CONTROLLER

BACKGROUND OF THE INVENTION

1. Field of the Invention

The present invention relates to a motor controller, and more particularly, to a motor controller which is capable of increasing a success rate of starting a motor.

2. Description of the Prior Art

Conventionally, there are two driving methods for driving a motor. The first driving method uses the Hall sensor for switching phases, so as to drive the motor. The second driving method does not use the Hall sensor to drive the motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the designer adjusts the related parameters of the motor under a specific power voltage. When the power voltage changes, if the power voltage is too large, it results that the coil current is too large. If the power voltage is too small, it results that the motor cannot achieve the desired rotation speed, such that it is unable to start the motor. Thus, a motor controller is needed to protect the motor coil and increase a success rate of starting the motor under different power voltages.

SUMMARY OF THE INVENTION

According to the present invention, a motor controller which is capable of increasing a success rate of starting a motor is provided. The motor controller is used for driving the motor, where the motor may be a three-phase motor. The motor has a first coil, a second coil, and a third coil. The motor controller comprises a switch circuit, a control unit, and a detecting unit. The switch circuit includes a first transistor, a second transistor, a third transistor, a fourth transistor, a fifth transistor, a sixth transistor, a first terminal, a second terminal, and a third terminal, where the switch circuit is coupled to the motor for driving the motor. The first terminal, the second terminal, and the third terminal respectively provides a first driving signal, a second driving signal, and the third driving signal for driving the motor. The first transistor is coupled to a fourth terminal and the first terminal while the second transistor is coupled to the first terminal and a fifth terminal. The third transistor is coupled to the fourth terminal and the second terminal while the fourth transistor is coupled to the second terminal and the fifth terminal. The fifth transistor is coupled to the fourth terminal and the third terminal while the sixth transistor is coupled to the third terminal and the fifth terminal. The system may provide a power voltage to the motor controller via the fourth terminal, so as to enable the motor controller to operate normally.

One terminal of the first coil is coupled to the first terminal. One terminal of the second coil is coupled to the second terminal. One terminal of the third coil is coupled to the third terminal. Furthermore, another terminal of the first coil is coupled to another terminal of the second coil and another terminal of the third coil. That is to say, the first coil, the second coil, and the third coil form a Y-shaped configuration. The control unit generates a first control signal, a second control signal, a third control signal, a fourth control signal, a fifth control signal, and a sixth control signal for respectively controlling the ON/OFF states of the first transistor, the second transistor, the third transistor, the fourth transistor, the fifth transistor, and the sixth transistor. The detecting unit is coupled to the first terminal, the second terminal, and the third terminal, so as to generate a first detecting signal and the second detecting signal to the control unit. The detecting unit may be used for detecting the current of the first coil and a back electromotive force of a floating phase. The switch circuit is configured to supply the current of the first coil L1 to the first coil. Moreover, the motor controller further comprises a pulse width modulation signal, where the pulse width modulation signal has a duty cycle. The control unit receives the pulse width modulation signal for adjusting a rotation speed of the motor.

When the motor is in a still state, the motor controller generates a fixed set of voltage waveforms to the first terminal, the second terminal, and the third terminal respectively, so as to enable the first driving signal, the second driving signal, and the third driving signal to be a six-step square wave signal or sinusoidal signal for driving the motor. At this moment the motor controller enters an early alignment state and enables the duty cycle of the pulse width modulation signal to vary rapidly, such that the current of the first coil may achieve a predetermined value within one electric period rapidly. When the current of the first coil achieves the predetermined value, the detecting unit enables the first detecting signal to change from a low level to a high level, so as to inform the control unit to record the duty cycle. Then the motor controller enables the duty cycle to decrease in a very slow rate for stabilizing the motor. Afterwards, the motor controller enables the motor to rotate in an accelerated pace. By the recorded duty cycle, the motor controller enables the current of the first coil to be less than or equal to a ratio of the predetermined value in a starting procedure, where the ratio may be greater than or equal to 1. When the rotation speed of the motor achieves a predetermined rotation speed, the motor controller starts a floating phase for detecting a phase switching time point, where the floating phase is formed in the first coil. When a zero crossing point of a back electromotive force is detected by the detecting unit, the detecting unit enables the second detecting signal to change from the low level to the high level, so as to inform the control unit to carry out a phase switching procedure. Thus, the motor controller may protect the first coil and increase the success rate of starting the motor under different power voltages.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
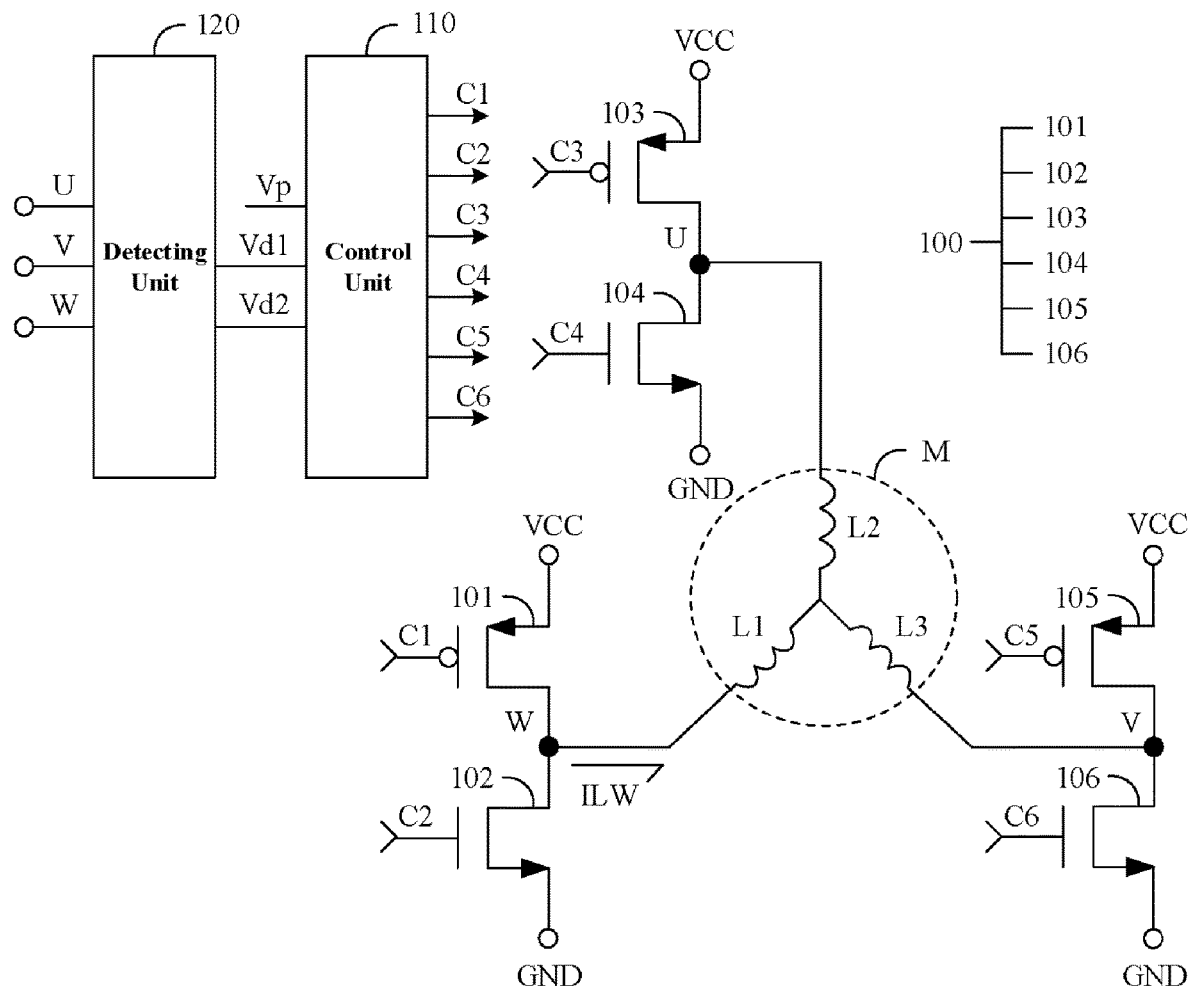
FIG. 1 is a schematic diagram showing a motor controller according to one embodiment of the present invention.

FIG. 1 is a schematic diagram showing a motor controller 10 according to one embodiment of the present invention. The motor controller 10 is used for driving a motor M, where the motor M may be a three-phase motor. The motor M has a first coil L1, a second coil L2, and a third coil L3. The motor controller 10 comprises a switch circuit 100, a control unit 110, and a detecting unit 120. The switch circuit 100 includes a first transistor 101, a second transistor 102, a third transistor 103, a fourth transistor 104, a fifth transistor 105, a sixth transistor 106, a first terminal W, a second terminal U, and a third terminal V, where the switch circuit 100 is coupled to the motor M for driving the motor M. The first terminal W, the second terminal U, and the third terminal V respectively provides a first driving signal WO, a second driving signal UO, and the third driving signal VO for driving the motor M. The first transistor 101 is coupled to a fourth terminal VCC and the first terminal W while the second transistor 102 is coupled to the first terminal W and a fifth terminal GND. The third transistor 103 is coupled to the fourth terminal VCC and the second terminal U while the fourth transistor 104 is coupled to the second terminal U and the fifth terminal GND. The fifth transistor 105 is coupled to the fourth terminal VCC and the third terminal V while the sixth transistor 106 is coupled to the third terminal V and the fifth terminal GND. The system may provide a power voltage to the motor controller 10 via the fourth terminal VCC, so as to enable the motor controller 10 to operate normally. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal W. One terminal of the second coil L2 is coupled to the second terminal U. One terminal of the third coil L3 is coupled to the third terminal V. Furthermore, another terminal of the first coil L1 is coupled to another terminal of the second coil L2 and another terminal of the third coil L3. That is to say, the first coil L1, the second coil L2, and the third coil L3 form a Y-shaped configuration. The control unit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The detecting unit 120 is coupled to the first terminal W, the second terminal U, and the third terminal V, so as to generate a first detecting signal Vd1 and the second detecting signal Vd2 to the control unit 110. The detecting unit 120 may be used for detecting the current ILW of the first coil L1 and a back electromotive force of a floating phase. The switch circuit 100 is configured to supply the current ILW of the first coil L1 to the first coil L1. Moreover, the motor controller 10 further comprises a pulse width modulation signal Vp, where the pulse width modulation signal Vp has a duty cycle. The control unit 110 receives the pulse width modulation signal Vp for adjusting the rotation speed of the motor M.

Figure 2:
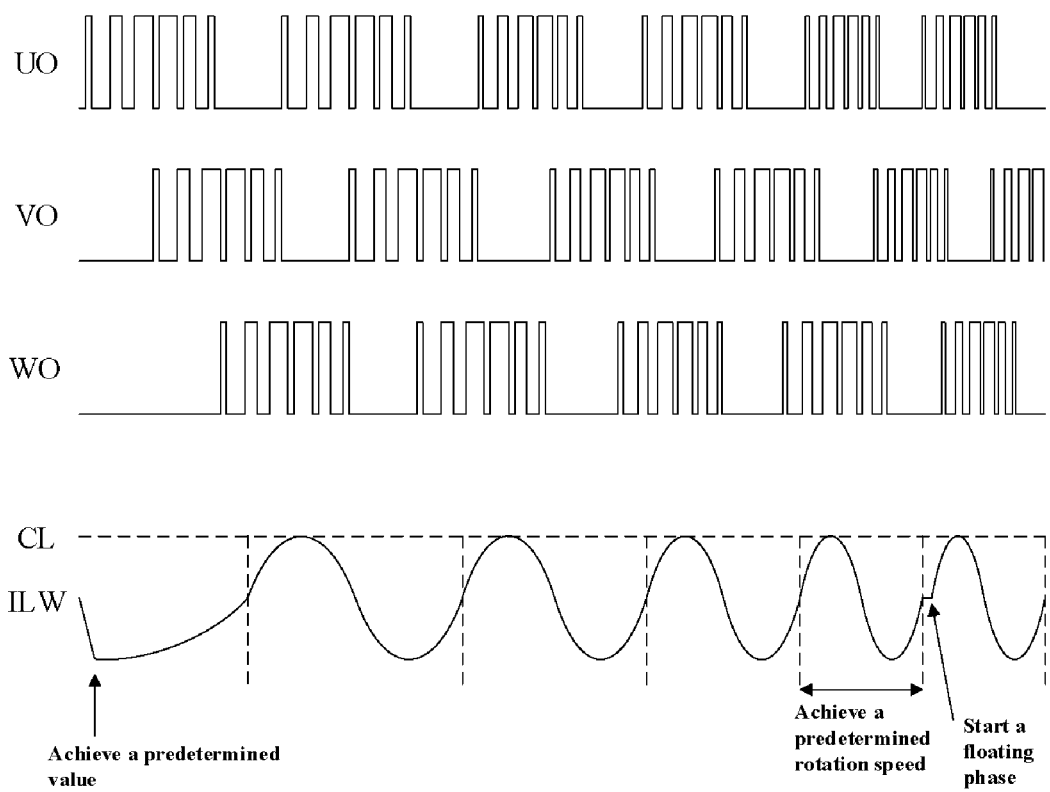
FIG. 2 is a timing chart according to one embodiment of the present invention.

FIG. 2 is a timing chart according to one embodiment of the present invention. When the motor M is in a still state, the motor controller 10 generates a fixed set of voltage waveforms to the first terminal W, the second terminal U, and the third terminal V respectively, so as to enable the first driving signal WO, the second driving signal UO, and the third driving signal VO to be a six-step square wave signal or sinusoidal signal for driving the motor M. At this moment the motor controller 10 enters an early alignment state and enables the duty cycle of the pulse width modulation signal Vp to vary rapidly, such that the current ILW of the first coil L1 may achieve a predetermined value CL within one electric period rapidly. When the current ILW of the first coil L1 achieves the predetermined value CL, the detecting unit 120 enables the first detecting signal Vd1 to change from a low level to a high level, so as to inform the control unit 110 to record the duty cycle. Then the motor controller 10 enables the duty cycle to decrease in a very slow rate for stabilizing the motor M. Afterwards, the motor controller 10 enables the motor M to rotate in an accelerated pace. By the recorded duty cycle, the motor controller 10 enables the current ILW of the first coil L1 to be less than or equal to a ratio of the predetermined value CL in a starting procedure, where the ratio may be greater than or equal to 1. When the rotation speed of the motor M achieves a predetermined rotation speed, the motor controller 10 starts a floating phase for detecting a phase switching time point, where the floating phase is formed in the first coil L1. When a zero crossing point of a back electromotive force is detected by the detecting unit 120, the detecting unit 120 enables the second detecting signal Vd2 to change from the low level to the high level, so as to inform the control unit 120 to carry out a phase switching procedure. Thus, the motor controller 10 may protect the first coil L1 and increase a success rate of starting the motor M under different power voltages. Furthermore, the motor controller 10 may additionally set a predetermined number of turns to decide whether or not to start the floating phase for detecting the phase switching time point. When the motor M rotates the predetermined number of turns, the motor controller 10 is allowed to start the floating phase for detecting the phase switching time point.

In order to increase the success rate of starting the motor M, the motor controller 10 is designed to be capable of completing the starting procedure successfully under different output loads. That is to say, each of an electric period of an early alignment stage, the predetermined value CL, the predetermined rotation speed, and the predetermined number of turns may be a variable value. For example, when the motor M is in a light load state, the electric period of the early alignment stage may be a smaller value. When the motor M is in a heavy load state, the electric period of the early alignment stage may be a larger value, such that the motor M has enough time to stabilize. When the motor is in the light load state, the predetermined number of turns may be a smaller value. When the motor is in the heavy load state, the predetermined number of turns may be a larger value.

One embodiment of the present invention utilizes a current limit technology, so as to enable a coil current to achieve a predetermined value rapidly within one electric period and record a duty cycle simultaneously. By the current limit technology, a motor controller is able to protect a motor coil and increase a success rate of starting a motor under different power voltages. The motor controller may be applied to a single-phase or polyphase configuration.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A motor controller, wherein the motor controller is used for driving a motor, the motor has a coil, and the motor controller comprising:
 a switch circuit, configured to supply a coil current to the coil;
 a control unit, coupled to the switch circuit via a plurality of control signals; and
 a pulse width modulation signal, wherein the control unit receives the pulse width modulation signal, the pulse width modulation signal has a duty cycle, when the motor is in a still state, the motor controller generates a fixed set of voltage waveforms to a first terminal, a second terminal, and a third terminal respectively, so as to enable a first driving signal, a second driving signal, and a third driving signal to be a six-step square wave signal or sinusoidal signal for driving the motor, at this moment the motor controller enters an early alignment state and enables the duty cycle to vary rapidly, such that the coil current to achieve a predetermined value within one electric period, and when the coil current achieves the predetermined value, the control unit records the duty cycle.

2. The motor controller of claim 1, wherein the motor controller is configured to increase a success rate of starting the motor.

3. The motor controller of claim 1, wherein when a rotation speed of the motor achieves a predetermined rotation speed, the motor controller starts a floating phase for detecting a phase switching time point.

4. The motor controller of claim 1, wherein when the motor rotates a predetermined number of turns, the motor controller is allowed to start a floating phase for detecting a phase switching time point.

5. The motor controller of claim 1, wherein the motor controller enables the electric period of the early alignment stage to be a variable value.

6. The motor controller of claim 1, wherein the motor controller further comprises a detecting unit, and the detecting unit is configured to generate a first detecting signal and a second detecting signal to the control unit.

7. The motor controller of claim 1, wherein the motor controller is applied to a single-phase or polyphase configuration.

* * * * *